United States Patent [19]
Dara

[11] Patent Number: 5,237,480
[45] Date of Patent: Aug. 17, 1993

[54] APPARATUS FOR FAULT DETECTION AND ISOLATION

[75] Inventor: Paul S. Dara, Broken Arrow, Okla.

[73] Assignee: Seiscor Technologies, Inc., Tulsa, Okla.

[21] Appl. No.: 919,398

[22] Filed: Jul. 29, 1992

Related U.S. Application Data

[63] Continuation of Ser. No. 484,961, Feb. 26, 1990, abandoned.

[51] Int. Cl.⁵ .............................................. H02H 3/28
[52] U.S. Cl. ........................................ 361/42; 361/86; 361/91; 361/92
[58] Field of Search ....................... 361/42, 59, 74, 86, 361/88, 91, 92, 56

[56] References Cited

U.S. PATENT DOCUMENTS

| | | | |
|---|---|---|---|
| 4,814,931 | 3/1989 | Kugelman et al. | 361/56 |
| 4,816,963 | 3/1989 | Eden | 361/91 |
| 4,999,728 | 3/1991 | Carl | 361/75 |

Primary Examiner—Todd E. DeBoer
Attorney, Agent, or Firm—William R. Clark; Richard M. Sharkansky

[57] ABSTRACT

An apparatus for fault detection and coupled between a power supply line and a circuit to be powered. When a fault develops in the circuit that causes voltage in the power supply lines to decrease, the power being provided is interrupted from the circuit. Once the fault is removed, power is automatically returned to the circuit.

2 Claims, 3 Drawing Sheets

APPARATUS FOR FAULT DETECTION AND ISOLATION

This application is a continuation of application Ser. No. 484,961 filed Feb. 26, 1990, now abandoned.

BACKGROUND OF THE INVENTION

This invention relates to a method and apparatus for fault detection and isolation and more specifically to the interruption of power to an electronic circuit when a short circuit occurs between a circuit power line and ground.

As is known in the art, circuit boards are typically mounted on a back plane and are powered with a common power supply. Power is distributed onto the back plane with power supply lines. Plugs are mounted on the back plane and connect to these power supply lines. Engaging with the plugs on the back plane are circuit boards with edge connectors. Power is fed from the power supply lines through the plugs on the back planes and into the respective circuit boards.

Under certain conditions, short circuits may develop on the circuit boards, causing circuitry on the board to fail. For example, moisture may develop across two adjacent circuit etches or integrated circuit leads. Electric current may then flow between the etches or leads, resulting in a short circuit. A short circuit may also occur by a technician inserting a circuit board into the back plane at a non-conventional angle. If this happens, the fingers on the plugs may short across the etches on the board. Further then testing a circuit board, the technician may touch two adjacent leads or etches on the board with an oscilliscope probe, resulting in a short circuit. A short circuit may also occur when a faulty component, such as defective circuit board, integrated circuit, resistor, or capacitor, has an internal short circuit.

If a circuit board cannot be isolated from a main power line when it occurs, the voltage level on the main supply line may drop below a predetermined level, thereby interrupting power to the other circuit boards. This failure may result in the system being brought down or the system's components operating outside their specified operating parameters. Operating components outside their specified operating parameters may reduce their life expectancy and may cause them damage. In order to prevent system failures and component damage, circuit boards are typically protected by a circuit breaker, or a fuse disposed on each circuit board. When a failure occurs, the fuse or circuit breaker blows or trips, thereby disconnecting power to the faulty circuitry.

Fuses and circuit breakers have many drawbacks. First, when fuses blow, they must be replaced. Accordingly, replacement fuses must be available to fix the circuit board. Second, fuses have the drawback of requiring manual replacement by a technican, as the circuit board must often be removed to replace the part. Circuit breakers have the drawback that once a circuit breaker trips, it remains in the trip position until it is manually reset. Accordingly, when the failure that caused the circuit breaker to trip is corrected, the circuit breaker remains in the trip position. Thus, a technician may have to be on-site to manually reset the circuit breaker. Another drawback is that when fuses are replaced, the technician may inadvertently replace the fuse with one of a higher amperage to prevent repeated fuse blowing. This higher amperage replacement may endanger the faulty board even further, as components on the board may be damaged before the fuse blows.

SUMMARY OF THE INVENTION

An object of this invention is to provide an improved apparatus for fault isolation.

A further object of this invention is to provide an apparatus that interrupts a circuit board from a main power supply when the short occurs on the circuit board and automatically restores power to the circuit board when the short goes away.

It is also an object of this invention to provide an apparatus that interrupts power entering a printed circuit board from a back plane when a short occurs on any one of the power supply lines on the printed circuit board.

An additional object of this invention is to interrupt power entering a printed circuit board from a back plane when a drop in the voltage level on the circuit board power supply line occurs.

Another object of this invention is to remotely interrupt power entering a printed circuit board from the back plane in response to a command signal from a control processing station.

A further object of this invention is to interrupt power to a printed circuit board when a short occurs, and to provide a fault indication signal once power is interrupted.

These and other objects are accomplished by a fault isolation circuit for interrupting power comprising an electronic circuit and supply means for providing power to said electronic circuit at a first voltage level. Also provided is means for providing a reference voltage level and switching means coupled to the supply means and the reference voltage line for interrupting power to the circuit when the difference in the voltage level between the first voltage level and the second voltage level exceeds a first predetermined value. Accordingly, the circuit is decoupled from the main power supply line when a fault on the circuit occurs, thereby preventing the circuit from interfering with other circuits on the main power supply line. It may be preferable that the switching means restores power to the circuit when the difference in the voltage level between the first voltage level and the reference voltage level is less than a second predetermined value to reconnect the circuit to the main power supply line when the fault on the circuit is removed. It may also be preferable that the circuit comprise means for generating a signal indicating a fault when the difference in the voltage level between the first voltage level and the reference voltage level exceeds the first predetermined value to signal to the operator that a fault is present on the circuit when that circuit has a power failure.

Also provided is a method of interrupting power being distributed to electronic circuitry from a main power source in response to a power fault occurring on the circuitry comprising the steps of sensing a voltage level on the electronic circuitry, generating a control signal when the voltage level on the electronic circuitry falls below a predetermined threshold. The method further includes the step of interrupting power to electronic circuitry from the main power supply source in response to the control signal. Thus, circuitry is removed from the main power supply when a short occurs across the power line on the circuit. It may also be preferable that the method further comprise the step of generating a second control signal, and interrupting power to the electronic circuitry in response to the second control signal to permit a control processor to isolate power from a circuit to be able to test the operation of the isolation circuitry.

BRIEF DESCRIPTION OF THE DRAWINGS

For a more complete understanding of the invention, reference is made to the drawings, wherein.

DESCRIPTION OF THE PREFERRED EMBODIMENTS

Figure 1:
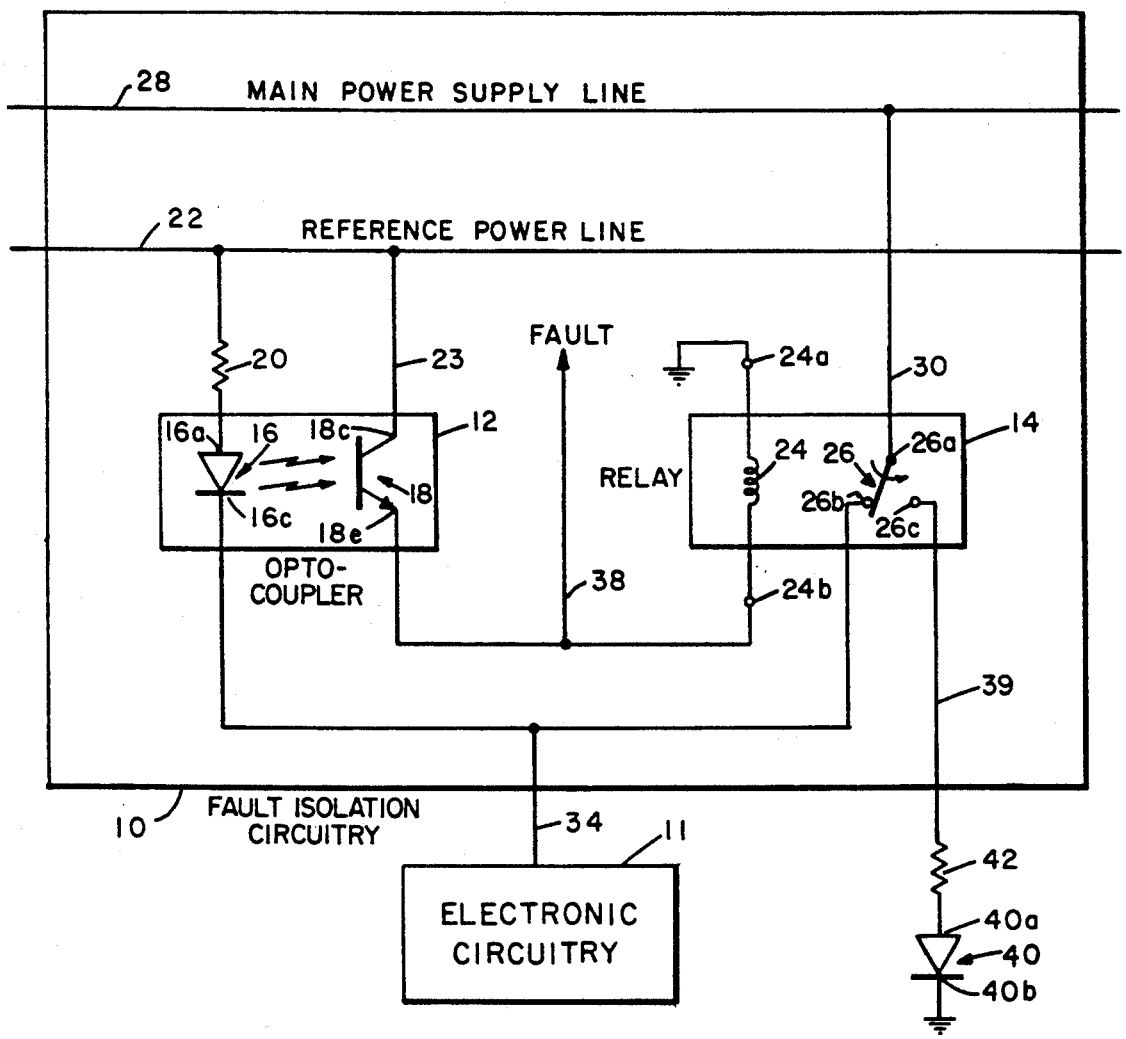
FIG. 1 is a schematic diagram of the protection circuit emcompassing the invention.

Referring to FIG. 1, there is shown fault isolation circuitry 10 coupled to reference power line 22, main power supply line 28, and electronic circuitry 11. Fault isolation circuitry 10 contains an opto-coupler 12 electrically connected to relay 14. Opto-coupler 12 contains a light emitting diode (LED) 16 having a cathode 16c and anode 16a. Also within opto-coupler 12 and optically coupled to LED 16 is photo-transistor 18 having a collector electrode 18c and emitter electrode 18e. Anode 16a is connected through resistor 20 to reference power line 22. Collector 18c of photo-transistor 18 is coupled to reference power line 22 through line 23.

Relay 14 contains coil 24 and switch contact 26. Switch contact 26 is controlled by coil 24 and contains terminals 26a–c. When switch contact 26 is in its normal position, terminal 26a is connected to terminal 26b. When coil 24 is activated, terminal 26a is coupled to terminal 26c. Terminal 26a is electrically connected to main power supply line 28 through line 30. Terminal 26b is connected to cathode 16c of LED 16 and electronic circuitry 11 through line 34.

Coil 24 has two terminals 24a and 24b. Terminal 24a is coupled to ground. Terminal 24b is coupled to the emitter electrode 18e of photo-transistor 18 through fault line 38.

LED 40 has an anode 40a and a cathode 40b. Terminal 26c of switch contact 26 is connected serially through line 39 and resistor 42 to anode 40a. The cathode 40b is connected to ground.

Power is fed through main power supply line 28 through fault isolation circuitry 10 and into electronic circuitry 11. Main power supply line 28 and reference power line 22 are coupled to a power supply (not shown). Preferably, the voltage level of reference power line 22 is less than or equal to the voltage level on main power supply line 28 and is selected to match relay coil 24 turn on voltage. The main power supply line 28 is preferably electrically isolated from reference power line 22.

During operation, power is fed onto main power supply line 28 through line 30, relay 14, and line 34 to electronic circuitry 11. On power up, photo-transistor 18 is non-conductive and coil 24 is not energized. Accordingly, terminal 26a is coupled to terminal 26b. When a short circuit or fault occurs on electronic circuitry 11, the voltage level across resistor 20 increases to approximately $R_{20} \times 10\text{mA}$, where $R_{20}$ is the resistance of resistor 20; and 10 mA current is typically drawn through LED 16. When the current through LED 16 increases to approximately 10 mAmps, LED 16 illuminates.

Photo-transistor 18 detects light from LED 16 and responds to the light by conducting current between collector electrode 18c and emitter electrode 18e. Further, current flows from reference power line 22 through line 23, collector electrode 18c and emitter electrode 18e, resulting in a fault signal being applied to fault line 38. Current also flows through fault line 38 and coil 24 to ground. Line 38 may also be connected to a fault reporting circuit or a control processor (not shown) so that a fault indication signal may be fed through fault line 38 to the control processor.

When the current and voltage on fault line 38 increases to a level sufficient to enable the voltage across coil 24 to reach a predetermined level, referred to as make current and make voltage, switch contact 26 disconnects terminal 26a from terminal 26b and connects terminal 26a to terminal 26c. The make current and the make voltage are dependent upon the type of relay 14 selected. When terminal 26a is disconnected from terminal 26b, the main power supply line 28 is disconnected from electronic circuitry 11, thereby isolating a faulty electronic circuitry 11 from the main power supply line 28.

When terminal 26a connects to terminal 26c, a fault signal is fed on line 39 to LED 40. In other words, current is fed from main power supply line 28 through line 30, switch contact 26 and onto line 39. Current is then fed through resistor 42, anode 40a and cathode 40b of light emitting diode (LED) 40 to ground. LED 40 illuminates in response to the increase in current on line 39, indicating that a failure has occurred in electronic circuitry 11.

When the fault is corrected in the electronic circuitry 11, the voltage level across LED 16 decreases to less than its forward voltage drop (typically 1.5 V), as the current fed from reference power supply line 22 through resistor 20, and LED 16 decreases. Accordingly, LED 16 reduces the illumination, resulting in the resistance between collector electrode 18c and emitter electrode 18e increasing. In response to this resistance increase, photo-transistor 18 applies a no-fault control signal onto fault line 38 by decreasing the current flow between reference power line 22 and coil 24. Accordingly, the voltage level across phototransistor 18 increases and the voltage level across coil 24 drops, resulting in terminal 26a disconnecting from terminal 26c and terminal 26a connecting to terminal 26b. When terminal 26b connects to terminal 26a, power to LED 40 is interrupted, thereby removing the fault indication. Further, main power supply line 28 becomes serially connected through line 30, relay 14, and line 34 to electronic circuitry 11.

Figure 2:
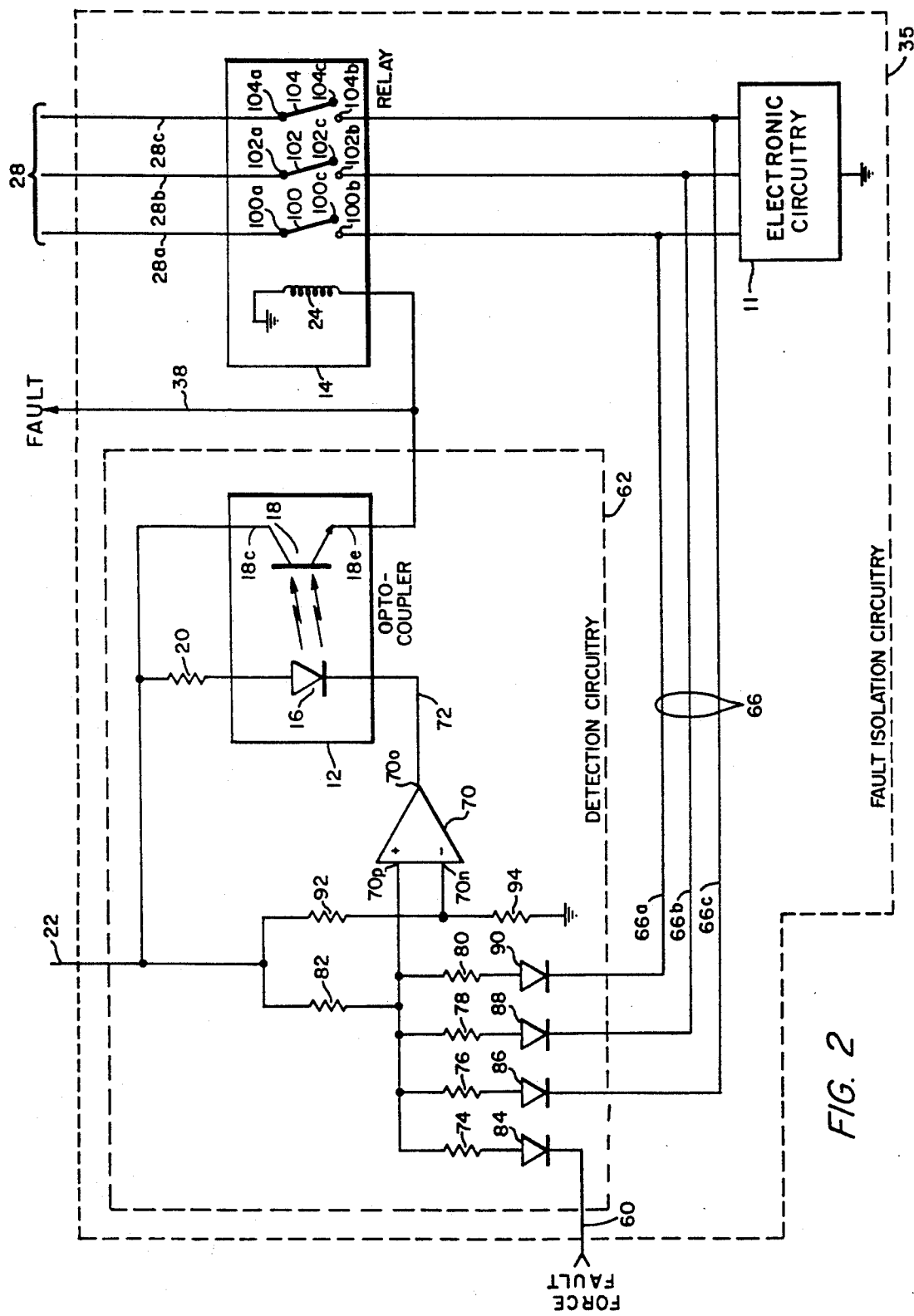
FIG. 2 is a schematic diagram of an alternate embodiment of the protection circuit emcompassing the invention.

Referring to FIG. 2, there is shown fault isolation circuit 35, an alternate embodiment of isolation circuit 10 illustrated in FIG. 1. Circuit 35 includes electronic circuitry 11, detection circuitry 62, and switching relay 14. Connecting detection circuit 62 to relay 14 are circuit supply lines 66a–c, referred to collectively as supply line 66, and fault line 38.

Detection circuitry 62 includes an amplifier 70 coupled to opto-coupler 12 through line 72. Amplifier 70 and opto-coupler 12 receive power from reference power line 22. Amplifier 70 has a positive input terminal 70p, a negative input terminal 70n, and an output terminal 70o. The positive input terminal 70p of amplifier 70 is connected to the junction of resistors 74, 76, 78, 80, and pull up resistor 82. Resistor 74 is connected to the anode of diode 84. The cathode of diode 84 is connected to force fault line 60. Resistor 76 is coupled to circuit supply line 66c through diode 86. Resistor 78 is connected to supply line 66b through diode 88. Resistor, 80 is coupled to supply line 66a through diode 90. Pull up resistor 82 is coupled to reference power line 22. Diodes 84, 86, 88, and 90 are "or"ed together to pull down the voltage level on terminal 70p when the voltage levels on either of supply lines 66a-c, or force fault line 60 decreases.

Negative input terminal 70n is coupled to the junction of resistor 94, which is tied to ground, and resistor 92, which is coupled to a reference power line 22. Pull up resistor 82 and resistors 92 and 94 are selected such that the voltage level on terminal 70n is less than the voltage level on 70p when supply lines 66a-c, and force fault line 60 have normal operational voltage levels. Further, the values of resistors 74, 76, 78, and 80 are selected such that when a fault occurs in electronic circuit 11, resulting in either a voltage level drop on supply lines 66a-c or a voltage level drop on force fault line 60. The voltage level on terminal 70p decreases to below the voltage level on terminal 70n.

The output terminal 70o is connected through line 72 to the cathode of LED 16. The anode of LED 16 is coupled through resistor 20 to reference power line 22.

Optically coupled to LED 16 within opto-coupler 12 is photo-transistor 18. The collector electrode of photo-transistor 18 is coupled to reference power line 22. The emitter electrode of photo-transistor 18 is coupled through line 38 to coil 24 and may be coupled to a microprocessor (not shown) to report faults.

Relay 14 includes coil 24 and switches 100, 102 and 104. Coil 24 is coupled between line 38 and ground. Switches 100, 102 and 104 includes terminals 100a-c, 102a-c, and 104a-c. Terminals 100a, 102a, and 104a are coupled to main power supply lines 28a-c, respectively, and terminals 100b, 102b and 104b are coupled to supply lines 66a-c, respectively.

Switches 100, 102 and 104 are activated by coil 24. Switches 100, 102 and 104 are normally in the closed position wherein terminal 100a connects to terminal 100b, terminal 102a connects to terminal 102b, and terminal 104a connects to terminal 104b. When coil 24 is activated, terminal 100a connects to 100c, terminal 102a connects to terminal 102c, and terminal 104a connects to terminal 104c. Thus, when coil 24 is activated, power supply lines 28a-c are decoupled from circuit supply lines 66a-c, respectively.

During operation, the voltage levels on supply lines 66a-c and force fault line 60 are normally high. When a fault occurs in electronic circuitry 11 resulting in a voltage level drop on circuit supply lines 66a-c, the voltage level decreases on positive input terminal 70p. Amplifier 70 then compares the voltage level on positive input terminal 70p to negative input terminal 70n and correspondingly responds to the voltage level decrease on terminal 70p by decreasing the voltage level on output terminal 70o proportionally. It is recognized that by using amplifier 70, small drops in the voltage levels across either of supply lines 66a-c will be detected, particularly when the DC resistance across supply lines 66a-c are less than 10 ohms.

A decrease of voltage level on terminal 70p results in a voltage level drop across LED 16. In response to the voltage drops across LED 16 of typically 1.5 V, LED 16 illuminates. Photo-transistor 18 responds to LED 16 illuminating by conducting current from reference power line 22 across collector and emitter electrodes 18c and 18e, resulting in a disconnect control signal being applied onto line 38 through coil 24 to ground.

This disconnect control signal preferably has a voltage level selected in accordance with relay coil 24 main voltage. Accordingly, when disconnect control signal is applied to line 38, relay coil 24 energizes. In response to coil 24 being energized, switches 100, 102, and 104 open to disconnect main power lines 28a-c from circuit supply lines 66a-c.

When the fault is corrected within electronic circuitry 11, the voltage level on the faulty circuit supply lines 66a-c increases. As the voltage level on circuit supply lines 66a-c increases, the voltage level applied to the positive input terminal 70p also increases. Amplifier 70 then compares the voltage level on positive input terminal 70p to negative input terminal 70n and correspondingly increases the voltage level applied from output terminal 70o onto line 72, proportionately. The increase of the voltage level on output terminal 70o and line 72 reduces the illumination of LED 16. Photo-transistor 18 decreases the current conducted from its collector electrode to its emitter electrode in response to the reduction in illumination of LED 16.

When the fault is corrected, a control signal is applied to fault line 38 that decreases the voltage level across coil 24 to zero. The control signal may also be fed to a control processor (not shown). This voltage level decrease results in switches 100, 102 and 104 closing. Relay 14 responds to the decrease in the voltage level across coil 24 by connecting main power supply line 28 to circuit supply line 66.

Besides a fault in electronic circuitry 11 causing main power supply line 28 to be disconnected from circuit supply lines 66a-c, the main power supply line 28 can also be disconnected from circuit supply line 66a-c by control processor (not shown) feeding a disconnect control signal through force fault line 60 to positive input terminal 70p. This disconnect control signal preferably has a low voltage level (preferably between 0 and 2 V). Amplifier 70 responds to this low voltage level on the positive terminal 70p by feeding a control signal to opto-coupler 12 that enables coil 24, resulting in relay 14 changing the positions of switches 100, 102 and 104 to disconnect main power supply line 28 from supply lines 66, as previously explained.

The main power supply line 28 is reconnected to circuit supply lines 66 by control processor applying a connect control signal, having a high voltage level (preferably between 3 V and 10 V) through force fault line 60 to positive input terminal 70p. Amplifier 70 responds to this high voltage level by feeding a high voltage signal to opto-coupler 12 that disables coil 24, resulting in the positions of switches 100, 102 and 104 closing.

Referring to FIG. 2, control processor may selectively disconnect main power supply line 28 from circuit supply line 66 to test the operation of fault isolation circuitry 35 by applying a disconnect control signal that lowers the voltage level on force fault line 60. Control processor may then selectively connect main power supply line 28 to circuit supply line 66 by applying a connect control signal that raises the voltge level on force fault line 60. Detection circuit 62 responds to the disconnect control signal on force fault line 60 by feeding a fault control signal through fault line 38 and into relay 14. Detection circuit 62 responds to the connect control signal by feeding a no-fault control signal through fault line 38 to relay 14. Relay 14 responds to a fault control signal by decoupling terminals 100a, 102a, 104a from terminals 100b, 102b, 104b to disconnect main power supply line 28 from circuit supply line 66, and responds to the no-fault control signal by coupling terminals 100a, 102, 104a to terminals 100b, 102b, 104b to connect main power supply line 28 to circuit supply line 66.

Figure 3:
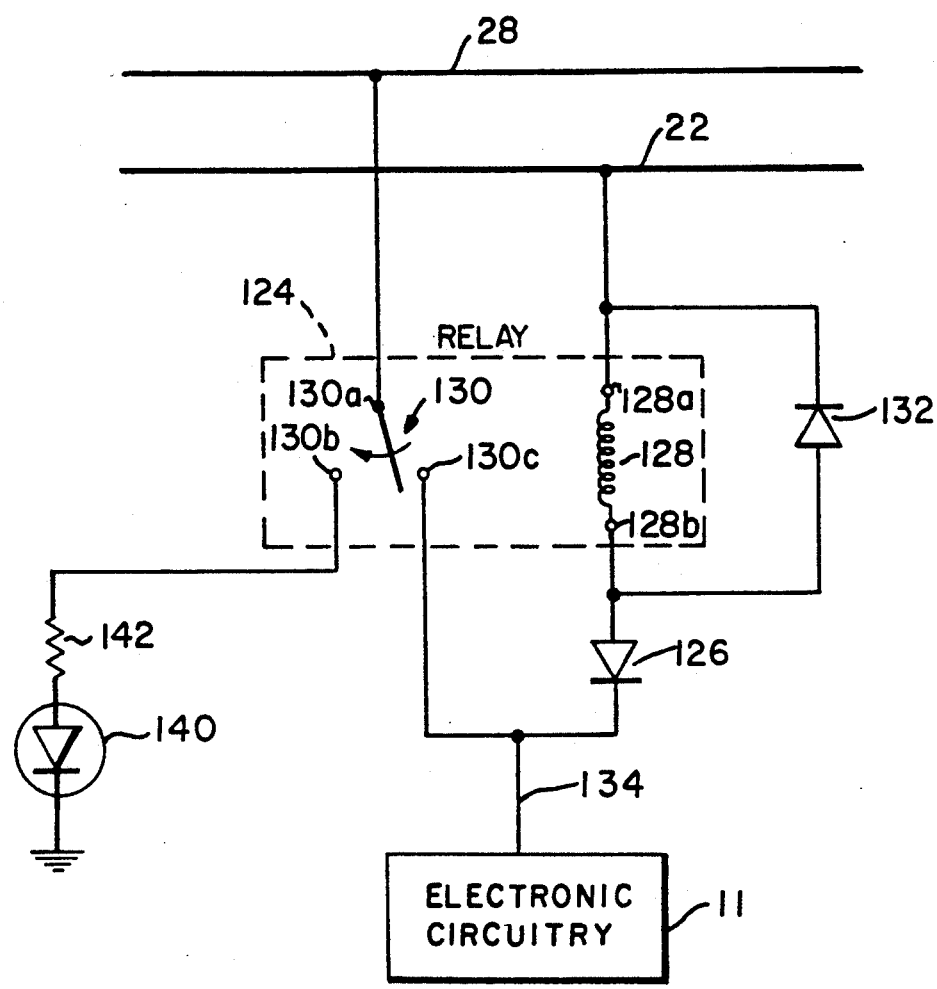
FIG. 3 is a schematic diagram of another alternate embodiment of the protection circuitry encompassing the invention.

Referring to FIG. 3, there is shown an alternate embodiment of the invention shown in FIG. 1. This embodiment comprises a relay 124 coupled to reference power line 22, main power supply line 28 and circuit supply line 134. The relay 124 has a coil 128 which is magnetically coupled to switch 130. Coil 128 has two terminals 128a and 128b. Terminal 128a is coupled to reference power line 22. Terminal 128b is coupled through diode 126 to circuit supply line 134. Circuit supply line 134 distributes power to electronic circuitry 11. Coupled between diode 126 and reference power line 22 is diode 132.

Switch 130 comprises three terminals; 130a, 130b and 130c. Terminal 130a is coupled to reference power line 28. Terminal 130c is coupled to diode 126 and circuit supply line 134. Terminal 130b is coupled in series through resistor 142 and light emitting diode (LED) 140 to ground.

During operation, the voltage level on main power supply line 28 is normally equal to the voltage level on reference power line 22. Coil 128 is normally deactivated, and terminal 130a is connected to terminal 130c. Main power supply line 28 remains electrically coupled to circuit supply line 134.

When a fault occurs on electronic circuitry 11, the voltage level on circuit supply line 134 typically decreases to ground level or substantially thereabout. The voltage level across coil 128 correspondingly increases. Switch 124 responds to the increase in voltage level across coil 128 by coupling terminal 130a to terminal 130b, thereby disconnecting circuit supply line 134 from main power supply line 28. Further, in response to terminal 130a being coupled to terminal 130b, power from reference power line 28 couples to LED 140 through resistor 142, causing LED 140 to illuminate, indicating a fault.

It is recognized that diode 132 is used to prevent misoperation under the condition where the reference power line 22 shorts to ground. If diode 132 was not present and reference power line 22 was to short to ground, coil 128 would energize and disconnect main power supply line 28 from circuit supply line 134, resulting in a drop in the voltage level on circuit supply line 134. Further, the voltage level across coil 128 would drop, resulting in switch 130 connecting terminal 130a to terminal 130c and connecting circuit supply line 134 to main power supply line 28. Consequently, coil 128 would again re-energize, resulting in switch 130 disconnecting terminal 130a from terminal 130c and connecting terminal 130a to terminal 130b. This process of connecting and disconnecting would continuously repeat itself, causing an undesirable continuous make-/break operation.

Having described the preferred embodiments of this invention, it is now evident that other embodiments incorporating these concepts may be used. It is felt, therefore, that this invention should not be restricted to the disclosed embodiments, but should be limited only by the spirit and scope of the appended claims.

What is claimed is:

1. Apparatus for interrupting power comprising:
   electronic circuitry;
   a main power supply line adapted for providing a preset voltage level to said electronic circuitry;
   a reference power line providing a reference voltage;
   an opto-coupler comprising a light emitting diode having a first terminal and second terminal, and a photo-transistor responsive to said light emitting diode and having a first terminal and a second terminal;
   said reference power line being coupled to said photo-transistor first terminal and said light emitting diode first terminal;
   said light emitting diode second terminal being coupled to said main power supply line at said electronic circuitry;
   said light emitting diode illuminating in response to a voltage level drop from said reference power line to said main power supply line at said electronic circuitry;
   said photo-transistor first terminal being coupled to said photo-transistor second terminal when said light emitting diode illuminates and said photo-transistor first terminal being de-coupled from said photo-transistor second terminal when said light emitting diode does not illuminate;
   a relay comprising a coil and a switch, said switch having a first terminal and a second terminal, said switch first terminal being electrically coupled to said main power supply line and said switch second terminal being electrically coupled to said electronic circuitry;
   said coil being electrically coupled to said photo-transistor second terminal, said coil being energized when said photo-transistor first terminal is coupled to said photo-transistor second terminal and said coil being de-energized when said photo-transistor first terminal is decoupled from said photo-transistor second terminal; and
   said switch first terminal being coupled to said switch second terminal when said coil is de-energized, said switch first terminal being decoupled from said switch second terminal when said coil is energized.

2. The apparatus as recited in claim 1 wherein said switch further comprises a third terminal, said switch first terminal being coupled to said switch third terminal when said coil is energized; and wherein said apparatus further comprises a second light emitting diode coupled to said third terminal, said second light emitting diode illuminating when said switch first terminal is coupled to said switch third terminal.

* * * * *